United States Patent
Jammoussi et al.

(10) Patent No.: US 9,447,744 B2
(45) Date of Patent: Sep. 20, 2016

(54) FUEL SHIFT MONITOR

(71) Applicant: Ford Global Technologies, LLC, Dearborn, MI (US)

(72) Inventors: Hassene Jammoussi, Canton, MI (US); Imad Hassan Makki, Dearborn Heights, MI (US); Michael James Uhrich, West Bloomfield, MI (US); Michael Casedy, Ann Arbor, MI (US); Kenneth John Behr, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 272 days.

(21) Appl. No.: 14/334,298

(22) Filed: Jul. 17, 2014

(65) Prior Publication Data

US 2016/0017827 A1  Jan. 21, 2016

(51) Int. Cl.
*F02D 41/14* (2006.01)
*F02D 41/22* (2006.01)
*F02D 41/12* (2006.01)
*F02D 41/24* (2006.01)

(52) U.S. Cl.
CPC ......... *F02D 41/1454* (2013.01); *F02D 41/123* (2013.01); *F02D 41/1402* (2013.01); *F02D 41/1439* (2013.01); *F02D 41/1495* (2013.01); *F02D 41/222* (2013.01); *F02D 41/2441* (2013.01); *F02D 41/2454* (2013.01); *F02D 41/126* (2013.01); *F02D 41/1456* (2013.01); *F02D 2041/224* (2013.01); *Y02T 10/40* (2013.01)

(58) Field of Classification Search
CPC ............... F02D 41/14; F02D 41/1454; F02D 41/1439; F02D 41/1402; F02D 41/1404; Y02T 10/40

See application file for complete search history.

(56) References Cited

U.S. PATENT DOCUMENTS

| 4,976,242 | A | * | 12/1990 | Sonoda | F02D 41/045 123/682 |
| 6,971,367 | B2 | * | 12/2005 | Satou | F02D 11/105 123/350 |
| 8,145,409 | B2 | | 3/2012 | Kerns et al. | |
| 8,201,396 | B2 | * | 6/2012 | Kawamura | F01N 9/00 60/295 |
| 2013/0180509 | A1 | | 7/2013 | Makki et al. | |
| 2013/0180510 | A1 | | 7/2013 | Makki et al. | |
| 2013/0231844 | A1 | | 9/2013 | Uhrich et al. | |

* cited by examiner

*Primary Examiner* — Hieu T Vo
(74) *Attorney, Agent, or Firm* — Julia Voutyras; Alleman Hall McCoy Russell & Tuttle LLP

(57) ABSTRACT

Methods and systems are described for evaluating presence of fuel shifts in an engine. In one example, a method comprises indicating a fuel shift based on a time delay of an exhaust gas sensor during an entry into and an exit out of deceleration fuel shut off (DFSO).

18 Claims, 8 Drawing Sheets

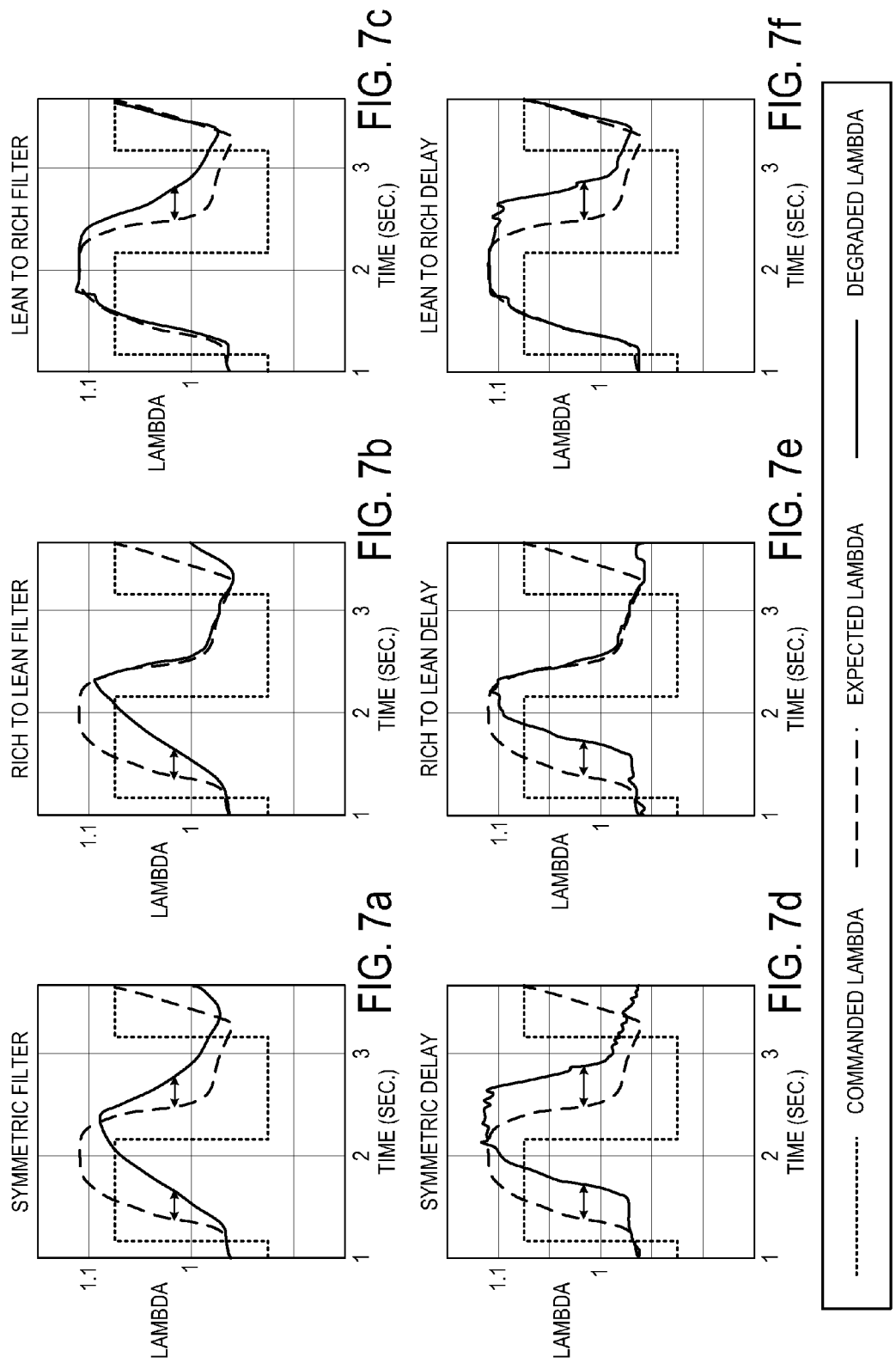

FUEL SHIFT MONITOR

TECHNICAL FIELD

The present disclosure relates to detecting fuel shifts in a motor vehicle.

BACKGROUND AND SUMMARY

An exhaust gas sensor may be positioned in an exhaust system of a vehicle to detect an air-fuel ratio of exhaust gas exiting from an internal combustion engine of the vehicle. Exhaust gas sensor readings may be used to control operation of the internal combustion engine to propel the vehicle.

The air-fuel ratio of exhaust gases may fluctuate from a desired ratio due to degradation in one or more components (e.g., a mass air flow (MAF) sensor, a fuel pump, etc.) or a change in fuel type. A lean fuel shift may result in a leaner than desired air-fuel ratio while a rich fuel shift may cause a richer than desired air-fuel ratio. Fuel shifts may affect engine control leading to an increase in emissions and/or reduced vehicle drivability. Accordingly, accurate determination of existing fuel shifts may reduce the likelihood of engine control degradation.

The inventors herein have recognized the above issues and identified an approach to at least partly address the above issues. In one embodiment, a method for an engine is provided for indicating a fuel shift based on a time delay of an exhaust gas sensor during an entry into and an exit out of deceleration fuel shut off (DFSO). Herein, fuel shifts during engine operation may be detected more accurately in a manner using existing hardware and fuel modulations that occur during DFSO events.

In one example, the exhaust gas sensor may be monitored for changes in air-fuel ratio, and a time delay response may be measured at each entry into and subsequent exit out of DFSO. As such, the exhaust gas sensor time delay response may be monitored during conditions that approximate lean-to-rich and rich-to-lean transitions to determine if fuel shifts are present without intrusive excursions. Herein, an entry time delay may be a duration from a start of the entry into DFSO to a first threshold change in air-fuel ratio. Further, an exit time delay may be a duration from a start of the exit out of DFSO to a second threshold change in air-fuel ratio. The entry time delay response may be compared with an expected entry time delay, and the exit time delay response may be compared to an expected exit time delay response. A rich fuel shift may be determined when the entry time delay is greater than the expected entry time delay, and the exit time delay is within a threshold of the expected exit delay. A lean fuel shift may be detected when the entry time delay is determined to be within a threshold of the expected entry time delay, and the exit time delay is greater than the expected exit time delay.

In this way, a non-intrusive and passive approach may be used to detect the presence of fuel shifts. Time delay responses from the exhaust gas sensor during entry into and exit out of DFSO events may provide a more robust signal that has less noise and higher fidelity. Thus, a more reliable diagnosis of existing fuel shifts may be made. Further, these fuel shifts may be mitigated by using closed loop feedback control and by tailoring engine control (e.g., throttle position, fuel injection amount and/or timing) responsive to the type of fuel shift.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7a, 7b, 7c, 7d, 7e and 7f depict graphs indicating six types of exhaust gas sensor degradation.

DETAILED DESCRIPTION

Figure 1:
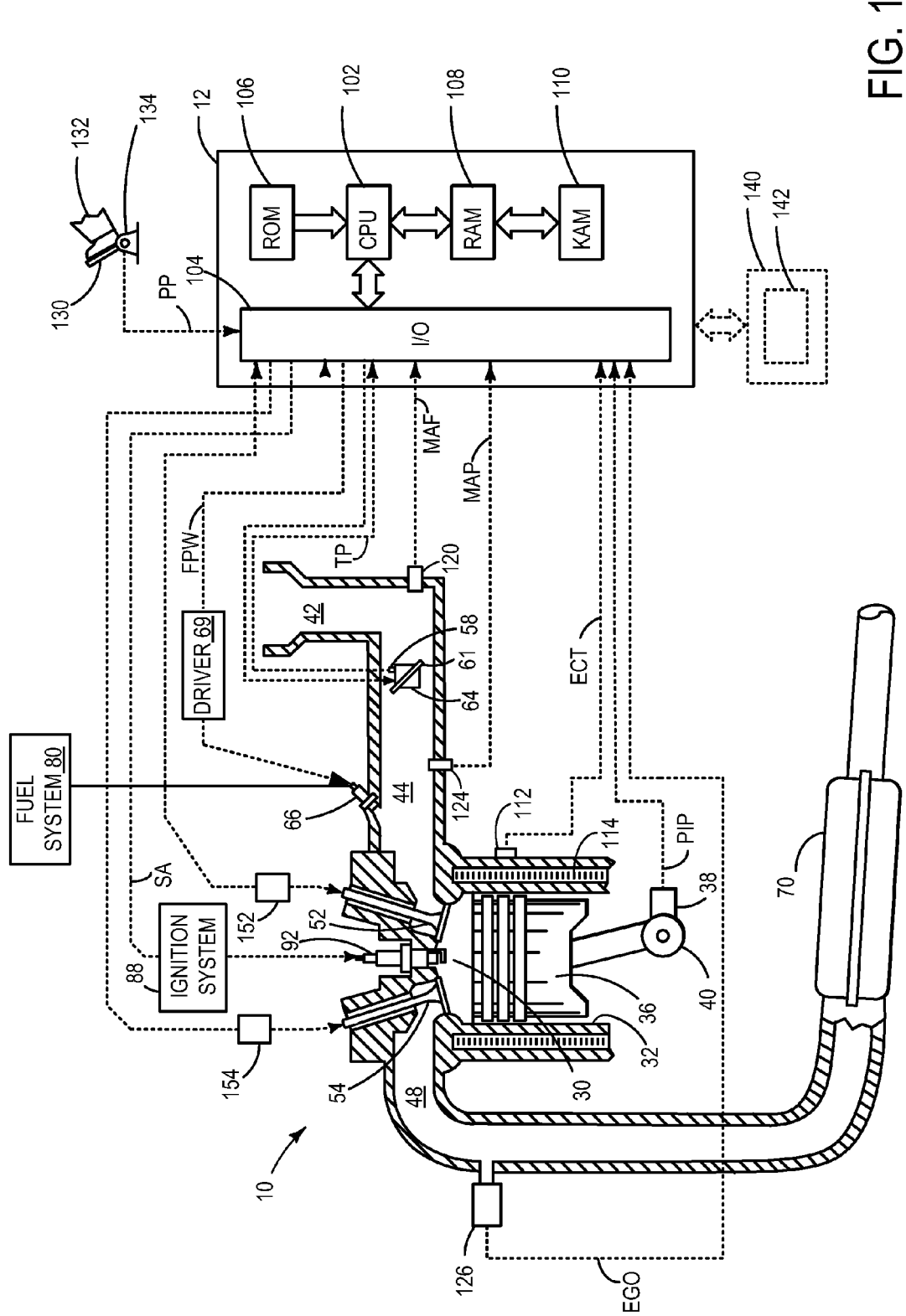
FIG. 1 depicts a schematic diagram of an embodiment of a propulsion system of a vehicle including an exhaust gas sensor.
Figure 2:
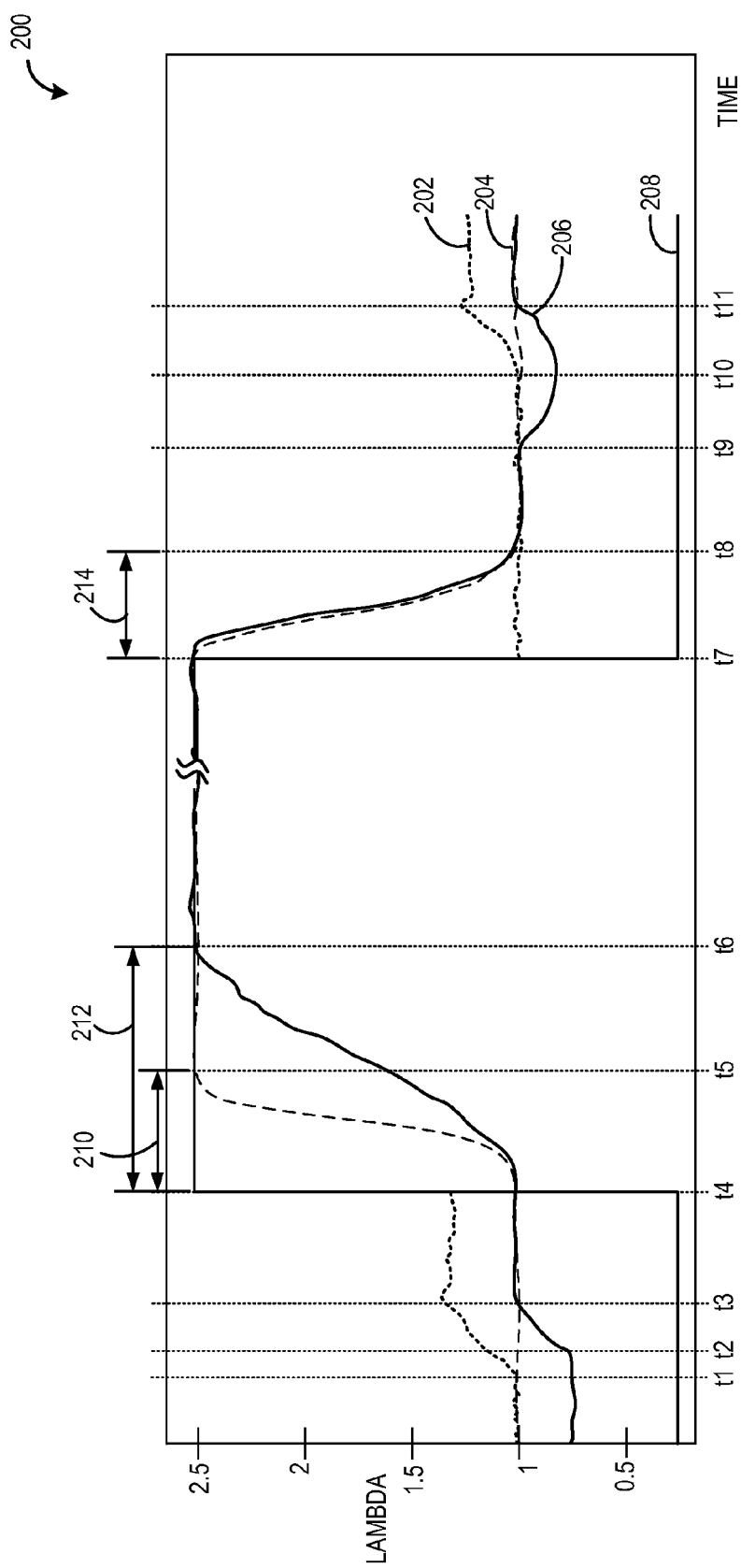
FIG. 2 shows a graph indicating an entry into and an exit out of DFSO when a rich fuel shift condition is present.
Figure 3:
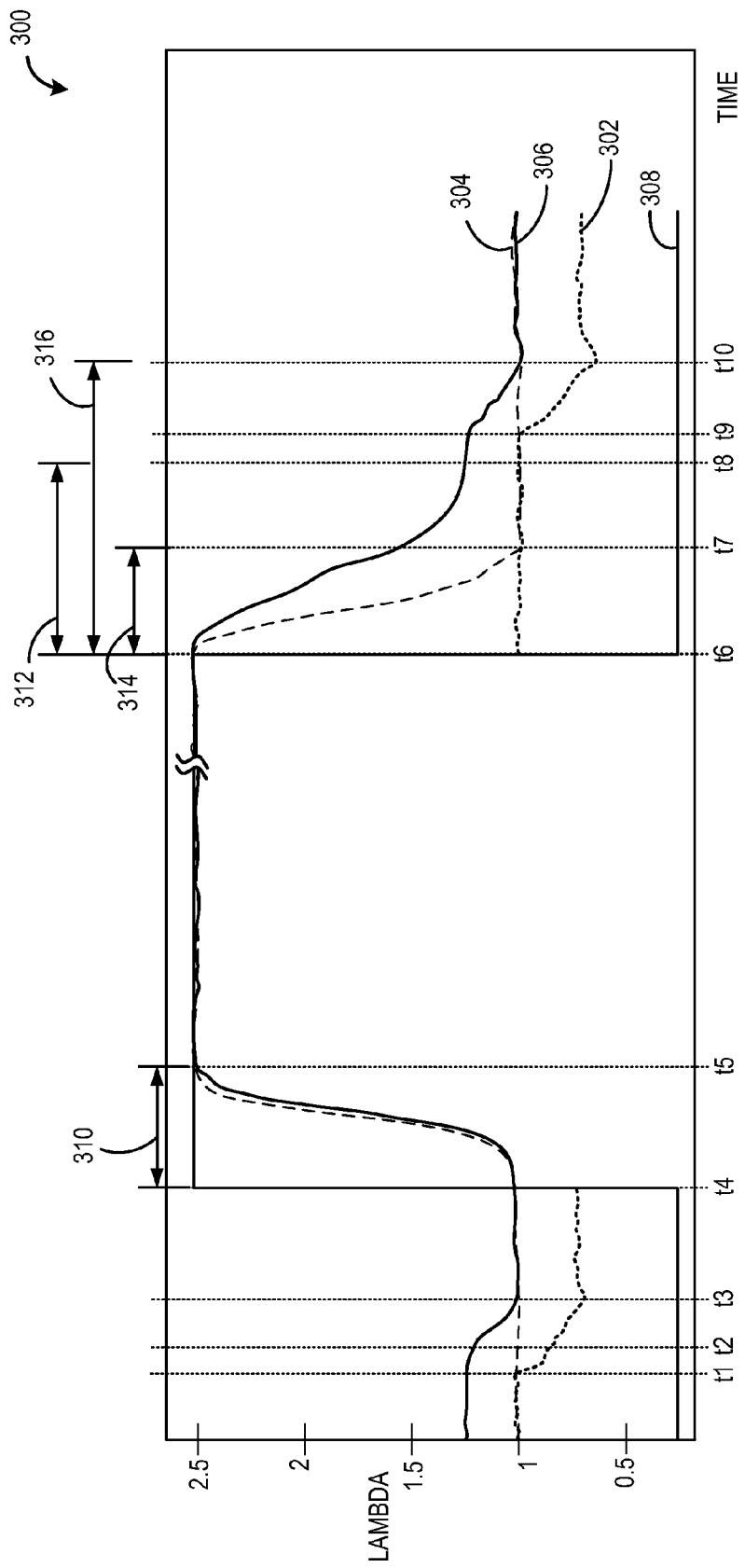
FIG. 3 illustrates a graph indicating an entry into and an exit out of DFSO when a lean fuel shift condition is present.
Figure 8A:
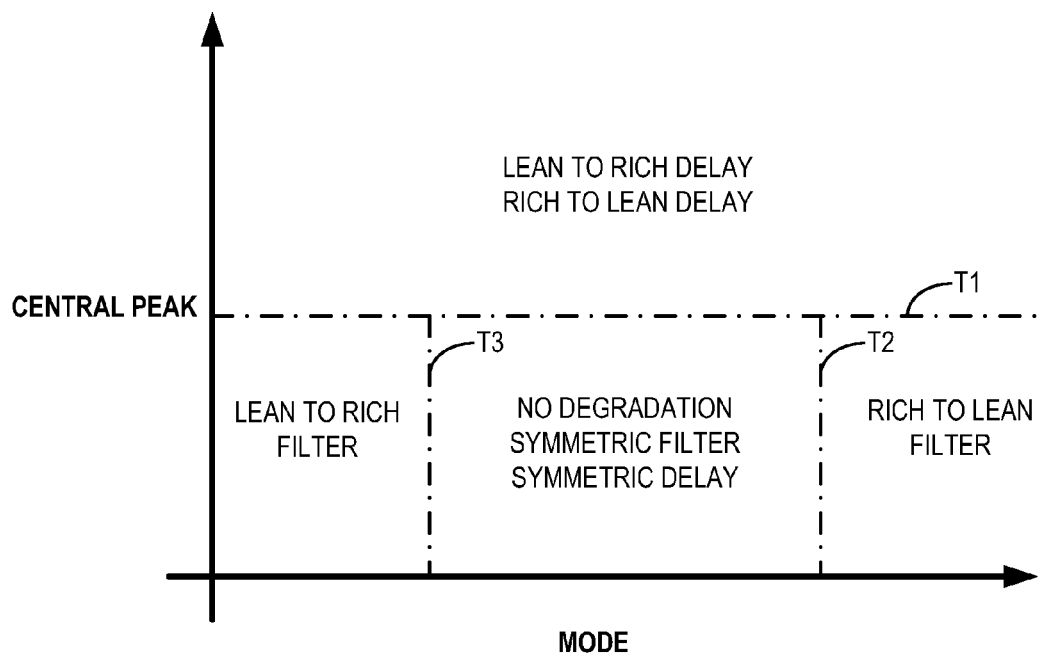
FIGS. 8a and 8b show example diagrams illustrating seven exhaust gas sensor classifications based on model parameters.
Figure 8B:
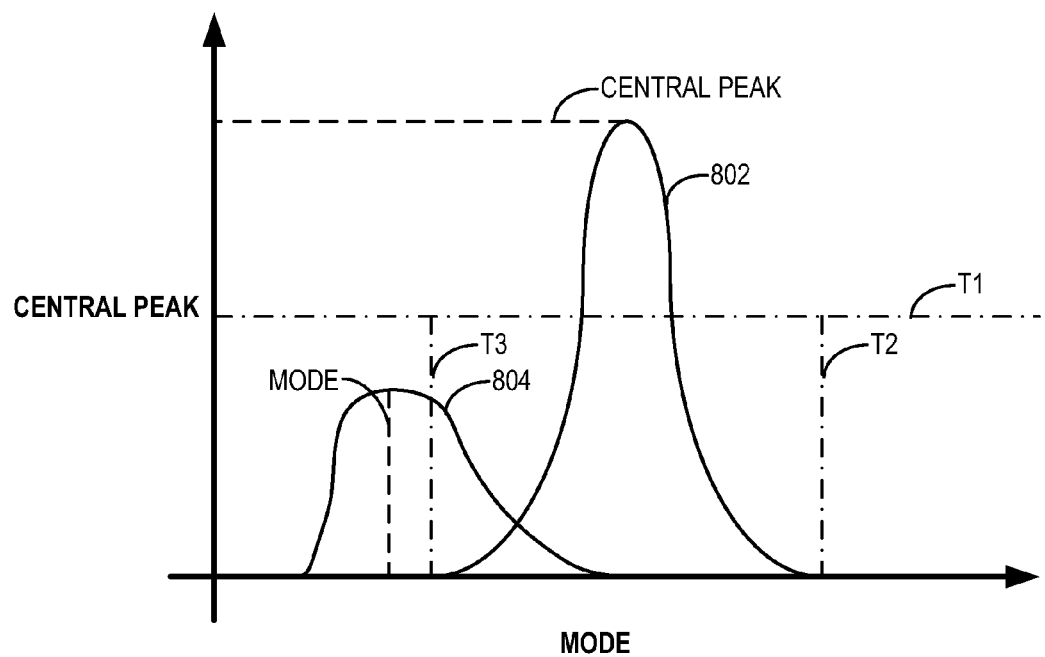

The following description relates to an approach for determining the presence of fuel shifts in an engine system, such as the engine system of FIG. 1. A fuel shift may be determined via monitoring time delay responses from an exhaust gas sensor during each entry into and exit out of DFSO, as shown in FIGS. 2 and 3, to non-intrusively monitor exhaust gas sensor responses during rich-to-lean and lean-to-rich transitions. Prior to monitoring time delays, the exhaust gas sensor may be evaluated for degradation based on six types of degradation behavior (FIGS. 7a-7f) and based on characteristics of a distribution of extreme values of calculated air-fuel ratio (also termed lambda) differentials (FIGS. 8a-8b). A controller may be configured to perform routines, such as those shown in FIGS. 4-6, for determining the presence of a fuel shift, classifying the fuel shift as a rich fuel shift or a lean fuel shift, and for adjusting engine operating parameters based on the determined fuel shift.

FIG. 1 is a schematic diagram showing one cylinder of multi-cylinder engine 10, which may be included in a propulsion system of a vehicle in which an exhaust gas sensor 126 may be utilized to determine an air-fuel ratio of exhaust gas produced by engine 10. The air-fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber 30 (also termed cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Fuel injector 66 is shown arranged in intake manifold 44 in a configuration that provides what is known as port injection of fuel into the intake port upstream of combustion chamber 30. Fuel injector 66 may inject fuel in proportion to the pulse width of signal FPW received from controller 12 via electronic driver 69. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. In one example, sensor 126 may be a UEGO (universal or wide-range exhaust gas oxygen) sensor. Alternatively, any suitable sensor for providing an indication of exhaust gas air-fuel ratio such as a linear oxygen sensor, a two-state oxygen sensor or EGO, a HEGO (heated EGO), a NOx, HC, or CO sensor may be used. In some embodiments, exhaust gas sensor 126 may be a first one of a plurality of exhaust gas sensors positioned in the exhaust system. For example, additional exhaust gas sensors may be positioned downstream of emission control device 70.

Emission control device 70 is shown arranged along exhaust passage 48 downstream of exhaust gas sensor 126. Emission control device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air-fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 38 (or other type) coupled to crankshaft 40; throttle position (TP) from a throttle position sensor 58; and absolute manifold pressure signal, MAP, from sensor 124. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 38, which is also used as an engine speed sensor, may produce a predetermined number of equally spaced pulses every revolution of the crankshaft.

Furthermore, at least some of the above described signals may be used in the fuel shift determination method described in further detail below. For example, the inverse of the engine speed may be used to determine delays associated with the injection-intake-compression-expansion-exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air fuel ratio and the exhaust gas sensor response rate.

In some embodiments, exhaust gas sensor degradation determination and fuel shift monitoring may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation and fuel shift determination. Note that dedicated controller 140 may receive engine parameter signals from controller 12 and may send engine control signals, fuel shift and degradation determination information among other communications to controller 12. In another example, the dedicated controller can be dispensed with and its operations performed by controller 12.

Note storage medium read-only memory 106 and/or processing resources 142 can be programmed with computer readable data representing instructions executable by processor 102 and/or dedicated controller 140 for performing various routine described below as well as other variants.

Turning now to FIGS. 2 and 3, these figures show example DFSO entry and exit operation plots and exhaust gas sensor time delays according to the present disclosure. Specifically, FIG. 2 depicts time delay responses during a transition into and out of DFSO when a rich fuel shift is present. Likewise, FIG. 3 demonstrates example time delay responses during a transition into and out of DFSO when a lean fuel shift is present.

FIG. 2 shows map 200 with air-fuel ratio or lambda plotted along the y-axis and time plotted along the x-axis. Plot 202 represents a commanded lambda (smaller dashes), plot 204 (larger dashes) shows an expected variation in air-fuel ratio during a DFSO event when no fuel shift is present, plot 206 (heavier solid line) indicates air-fuel ratio variations when a rich fuel shift is present, and plot 208 shows a DFSO event.

Prior to time t1, the engine may be operating at a richer than commanded air-fuel ratio. In other words, the engine may be operating at a lower lambda (plot 206) than the commanded lambda (plot 202). In the example shown, commanded lambda may be at one or at stoichiometric ratio. At t1, based on feedback, a controller may correct for the richer than desired air-fuel ratio and may command a leaner air-fuel ratio to bring combustion back to the desired stoichiometric air-fuel ratio. Accordingly, a leaner bias in lambda may be commanded at t1 as seen by the rise in plot 202. In response to the change in commanded lambda, the measured lambda (plot 206) may rise (as the air-fuel ratio becomes leaner) and at t3, reach the originally desired value, e.g. stoichiometric ratio. Between t3 and t4, therefore, the engine may be operated with a commanded lambda that is leaner than the originally commanded value so that the measured lambda is maintained at the desired ratio.

At t4, a DFSO event may be initiated (plot 208) whereupon the commanded lambda may be deactivated as fuel injection is ceased. Thus, during entry into DFSO, the engine may transition from a stoichiometric operation to a leaner operation. As fuel injection is disabled and based on the duration of the DFSO event, exhaust air-fuel ratio may reach a significantly lean value with a larger proportion of air with trace amounts of fuel. Accordingly, measured lambda increases between t4 and t6.

Further, starting at t4, as the entry into DFSO is commanded, changes in air-fuel ratio as sensed by the exhaust gas sensor may be recorded until a first threshold change in the measured lambda is observed. In the example shown, the first threshold change occurs at t6 when a steady state lambda value in plot 206 is reached, e.g. a lambda of about 2.5 in FIG. 2. In other examples, the first threshold change may be when 75% of steady state lambda value is achieved. For example, the first threshold change may be an air-fuel ratio that is richer than 2.5 but leaner than stoichiometry. In still other examples, the threshold change in lambda may be a smaller change that indicates the response to the commanded change has started, e.g., 5%, 10%, 20%, etc. Further, an entry into DFSO may be considered to be completed when a steady state lambda value is attained.

As will be observed in FIG. 2, plot 204 showing the expected change in lambda when no fuel shift is present reaches a steady state lambda, specifically, a respective first threshold change in lambda, at time t5. However, with a rich fuel shift condition present, a steady state lambda value (or a first threshold change in lambda) may be achieved at t6, a time later than the expected time t5. Thus, with a rich fuel shift, the air-fuel ratio within the engine may take a longer time to reach a steady state leaner lambda value when entering DFSO.

Arrow 212 illustrates a measured entry time delay, which is the time duration from a start of the entry into DFSO at t4 to time t6 when the first threshold change in the measured lambda is achieved. Arrow 210 indicates an expected time delay, which is the time duration from the start of the entry into DFSO at t4 to time t5 when the first threshold change in lambda is expected when no fuel shifts are present. Arrow 212 may be compared to arrow 210 to determine if the measured entry time delay exceeds the expected entry delay. As can be observed from FIG. 2, when a rich fuel shift is present, the time delay of the exhaust gas sensor during the entry into DFSO (arrow 212) is greater than the expected entry time delay (arrow 210).

Between t6 and t7, the engine may be maintained in DFSO condition at a steady state leaner lambda value. At t7, an exit out of DFSO may be initiated and fuel injection may be resumed. Thus, during the exit out of DFSO, the engine may be commanded from lean operation to rich operation. In the example shown, commanded lambda may be stoichiometry. As at DFSO entry, changes in air-fuel ratio over time may be monitored. Measured lambda (plot 206) decreases as the mixture becomes richer. At t8, the measured lambda reaches the desired, commanded value (herein, stoichiometry) at or about the same time that the expected change in air-fuel ratio (plot 204) reaches the desired ratio (stoichiometry).

Arrow 214 portrays the time delay from a start of the exit out of DFSO until a second threshold change in lambda is achieved. The exit time delay is a duration from the start of exit out of DFSO to the second threshold change in lambda. In the example of FIG. 2, the second threshold change in lambda is when stoichiometry is attained. With a rich fuel shift condition, measured lambda may reach stoichiometry at substantially the same rate and time as the expected lambda change when a fuel shift condition is absent. Specifically, the measured exit time delay (arrow 214) during a rich fuel shift may be substantially the same as an expected exit time delay. In another example, the measured exit time delay may be within a threshold of the expected exit delay. For example, the measured exit time delay may be within 5% of the expected exit delay.

Thus, a rich fuel shift may be indicated when the time delay of the exhaust gas sensor during the entry into DFSO is greater than an expected entry time delay, and the time delay of the exhaust gas sensor during the exit out of DFSO is within a threshold of an expected exit delay.

Returning to FIG. 2, at t9, the measured lambda may decrease with time due to the rich fuel shift producing a richer than desired air-fuel ratio. Accordingly, at t10, the commanded lambda is increased to a leaner ratio. Therefore, between t10 and t11, measured lambda increases and attains a desired value at t11. Herein, as mentioned earlier, the desired air-fuel ratio may be a stoichiometric ratio. Beyond t11, the engine may be operated with a commanded lambda that is leaner to ensure that the measured lambda is at a desired value.

FIG. 3 shows map 300 with air-fuel ratio or lambda plotted along the y-axis and time plotted along the x-axis. Plot 302 indicates a commanded lambda (smaller dashes), plot 304 (larger dashes) represents an expected variation in air-fuel ratio when no fuel shift is present, plot 306 (heavier solid line) shows air-fuel ratio variations when a rich fuel shift is present, and plot 308 indicates a DFSO event.

Prior to time t1, the engine may be operating at a leaner air-fuel ratio or higher lambda (plot 306) than the commanded lambda (plot 302). In the example shown, commanded lambda may be one (at a stoichiometric ratio). At t1, based on feedback, the controller may correct for the leaner than desired lambda by commanding a richer air-fuel ratio. Accordingly, a richer bias in lambda may be commanded at t1 as seen by the decrease in plot 302. In response to the change in commanded lambda, the measured lambda (plot 306) may decrease resulting in a richer air-fuel ratio, and at t3, measured lambda may attain the originally desired value, e.g. stoichiometry. Between t3 and t4, therefore, the engine may be operated with a commanded lambda that is richer than the originally commanded value so that the measured lambda is maintained at the desired air-fuel ratio (herein, stoichiometry).

At t4, a DFSO event may be initiated (plot 308) whereupon the commanded lambda may be deactivated as fuel injection is ceased. Thus, during entry into DFSO, the engine may transition from a stoichiometric operation to a leaner operation. Accordingly, between t4 and t5, measured lambda increases as the air-fuel ratio becomes leaner. Plot 304 depicting the expected variation in lambda also increases between t4 and t5.

Changes in air-fuel ratio may be monitored over time and recorded until a first threshold change in the measured lambda is observed. In the example shown, similar to FIG. 2, the first threshold change is when a steady state lambda value is reached, e.g. a lambda of 2.5. In other examples, the first threshold change may be when 75% of steady state lambda value is achieved. For example, the first threshold change may be an air-fuel ratio that is richer than 2.5 but leaner than stoichiometry. In still other examples, the threshold change in lambda may be a smaller change that indicates the response to the commanded change has started, e.g., 5%, 10%, 20%, etc. Further, an entry into DFSO may be considered to be completed when a steady state lambda value is attained.

In the presence of a lean fuel shift condition, the measured lambda and expected lambda at DFSO entry may attain a steady state value at substantially the same time t5. Arrow 310 depicts the entry time delay as measured. Arrow 310 also indicates the expected entry time delay. The entry time delay, as explained earlier, is a duration from the start of the entry into DFSO to a first threshold change in lambda. Herein, the duration of expected entry delay and the measured entry delay are substantially the same. In other examples, the measured entry time delay may be within a threshold of the expected entry time delay. For example, the measured entry delay may be within 5-10% of the expected entry delay.

Between t5 and t6, the DFSO condition may be continued and measured lambda may remain at the steady state. At t6, an exit out of DFSO may be commanded and fuel injection may be resumed. Thus, during the exit out of DFSO, the engine may be commanded from lean operation to rich operation. In this example, lambda may be commanded to stoichiometric operation. As the air-fuel ratio becomes richer, measured lambda (and expected lambda) decreases. However, because a lean fuel shift is present, measured lambda decreases at a slower rate than expected.

As shown in FIG. 3, plot 304 depicting the expected lambda may reach the desired commanded lambda (herein, the value of one or stoichiometric ratio) at t7. The expected exit time delay from t6 until t7 is indicated by arrow 314. To elaborate, the exit time delay may be a duration from the start of the exit out of DFSO to a second threshold change in lambda. Since a lean fuel shift is present, measured lambda may not reach the commanded lambda e.g., stoichiometric ratio, at the expected time but may reach a steady state value at t8. Herein, the steady state value is at an air-fuel ratio that is leaner than commanded. Arrow 312 indicates the measured exit delay as a duration between time t6 when exit out of DFSO is initiated until a steady state lambda is attained, at t8. In the example shown, the second threshold change may be when lambda reaches a steady state value. In another example, the second threshold change in lambda may occur when lambda attains a commanded lambda. In still other examples, the second threshold may be a smaller change that indicates that the response to the commanded change has been initiated. For example, the second threshold may be 10%, 20%, etc. of the commanded lambda.

Since the exhaust air-fuel ratio at t8 remains leaner than commanded, the controller may command a richer air-fuel ratio at t9. In one example, fuel injection may be increased. In another example, throttle opening may be decreased. Between t9 and t10, commanded lambda may decrease (or air-fuel ratio may be commanded to a richer value). In response to the change in commanded lambda, measured lambda also decreases between t9 and t10. At t10, measured lambda attains a desired value e.g., stoichiometric ratio. Beyond t10, the commanded lambda is maintained at a level that is richer than originally commanded at t7 and consequently, the measured lambda is maintained at a desired air-fuel ratio.

As mentioned earlier, arrow 314 indicates an expected exit time delay when no fuel shift is present while arrow 312 indicates the measured exit time delay until a first steady state lambda value is attained. In alternative examples, the second threshold change in lambda may be achieved upon attainment of a desired lambda. Herein, arrow 316 may indicate the duration from initiation of exit out DFSO at t6 until the desired air-fuel ratio e.g., stoichiometry, is achieved at t10.

The measured exit time delay as indicated by arrow 312 (or arrow 316) exceeds the expected exit delay indicated by arrow 314. Thus, a lean fuel shift may be determined if the time delay response of the exhaust gas sensor when entering DFSO is within a threshold of an expected entry time delay, and the time delay of the exhaust gas sensor when exiting out of DFSO is greater than an expected exit time delay.

In this way, by monitoring exhaust gas sensor time delay responses during a DFSO event and comparing these measured responses with expected time delay responses, fuel shift conditions may be detected in a simple, non-intrusive manner.

Figure 4:
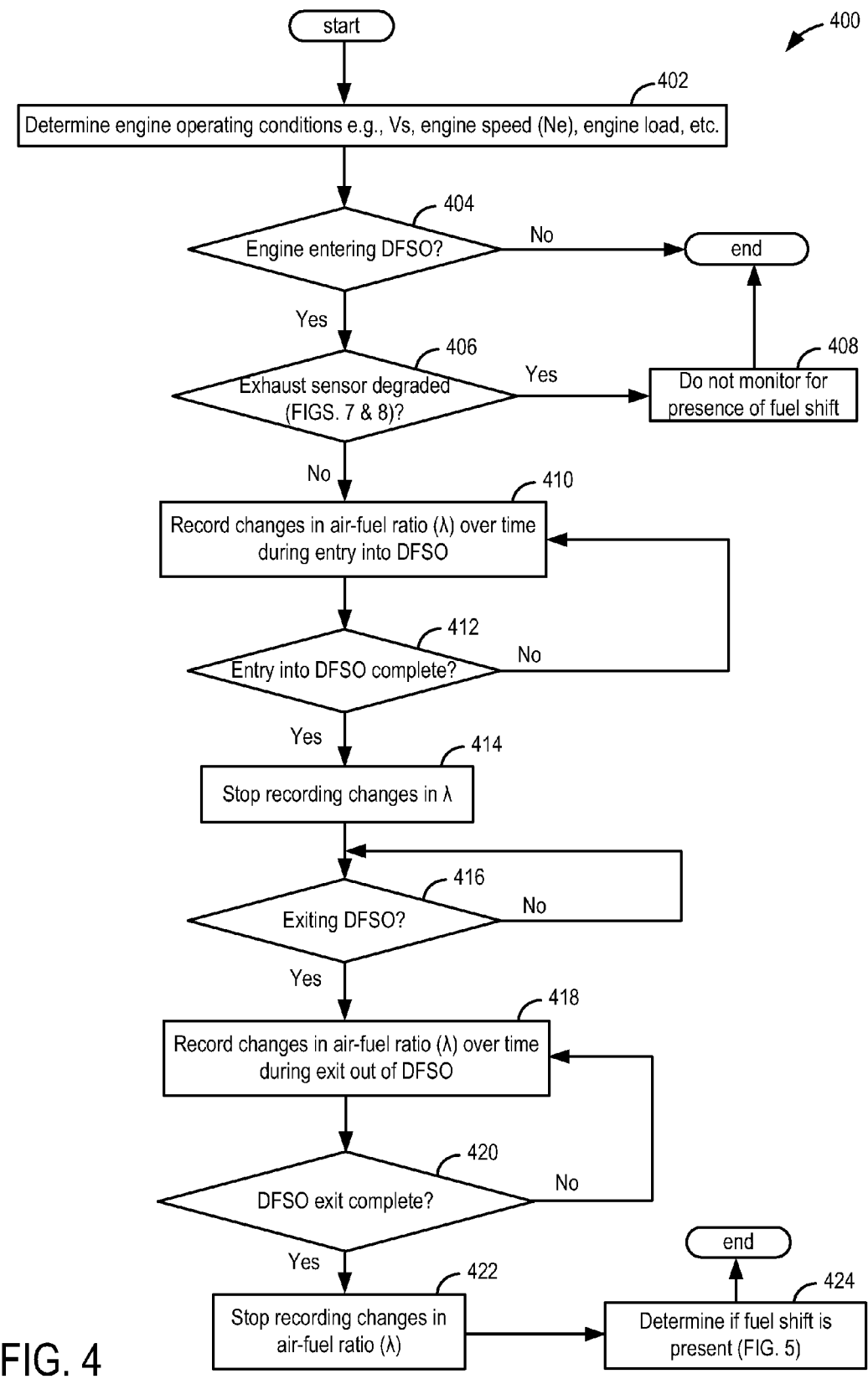
FIG. 4 is an example flow chart illustrating a method performed by a controller when the engine enters and exits DFSO in accordance with the present disclosure.
Figure 5:
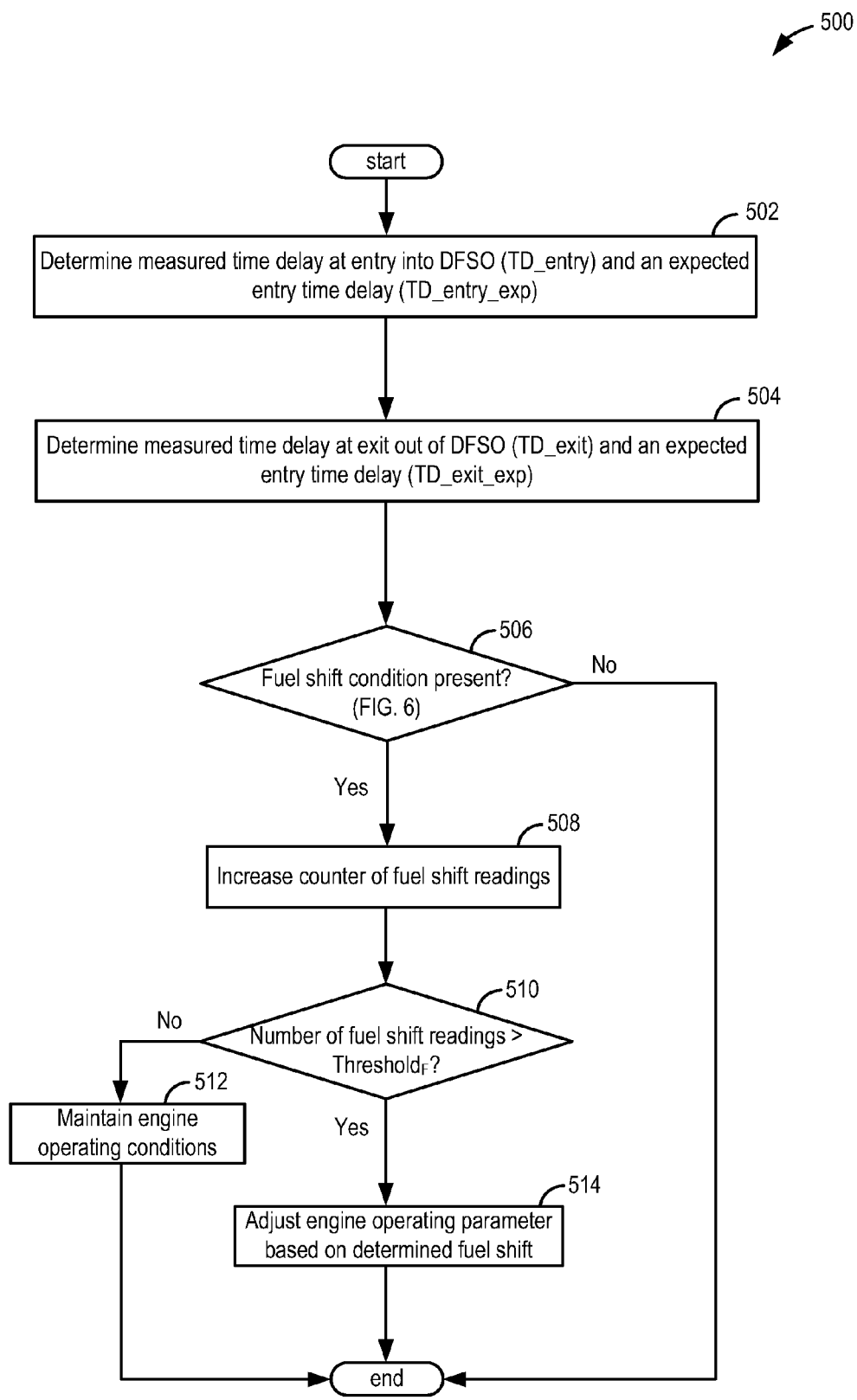
FIG. 5 is an example flowchart depicting a method for diagnosing fuel shifts according to an embodiment of the present disclosure.
Figure 6:
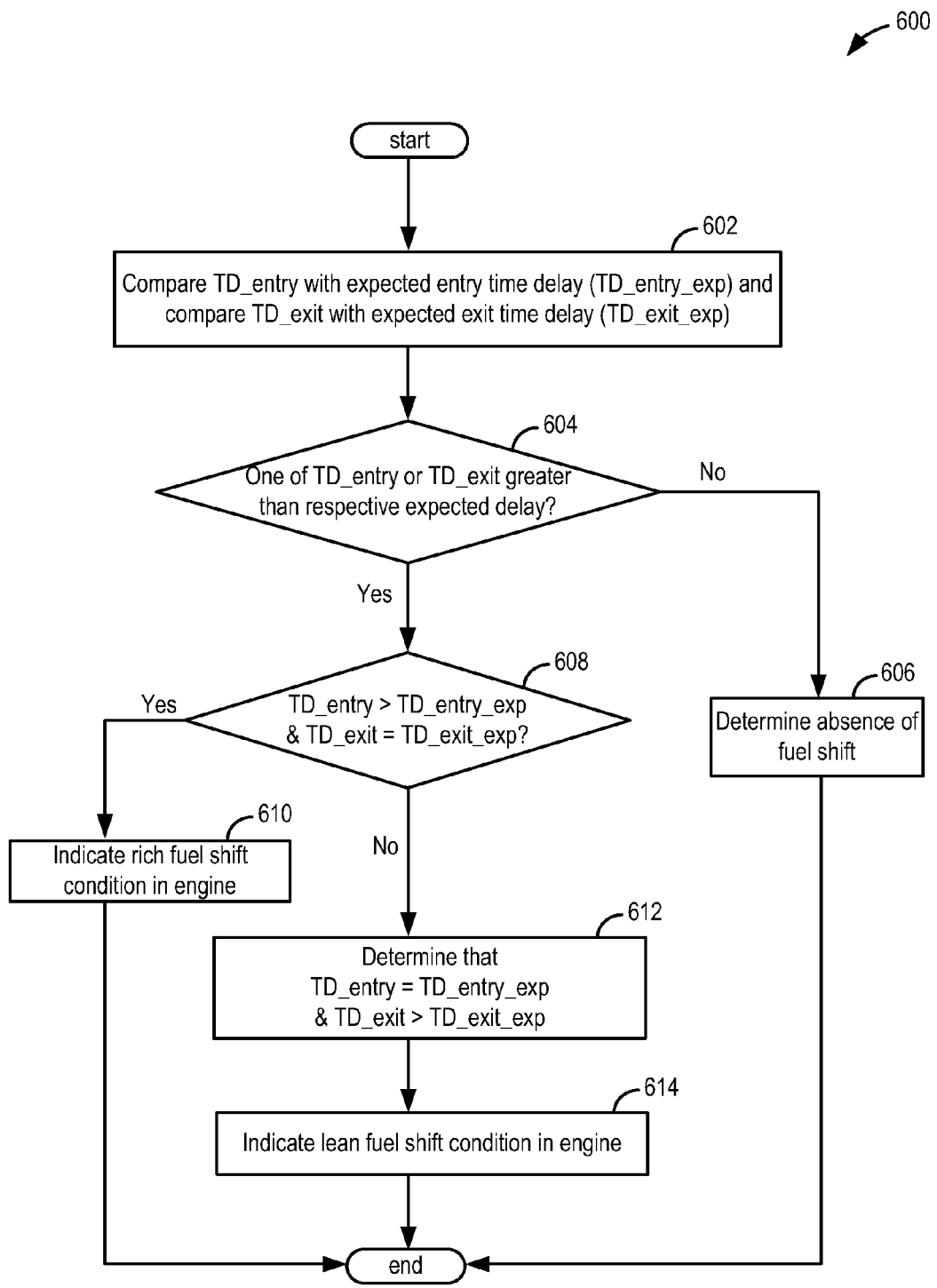
FIG. 6 shows an example flowchart for confirming whether a fuel shift is a rich fuel shift or a lean shift, according to the present disclosure.

Turning now to FIGS. 4-6, they illustrate various routines that a controller of a vehicle, such as controller 12 and/or dedicated controller 140, may be configured to activate for determining the presence of a fuel shift in an engine via a sensor such as exhaust gas sensor 126 (shown in FIG. 1).

Referring to FIG. 4, it shows routine 400 for collecting data related to changes in air-fuel ratios over time during an entry into and exit out of DFSO. Specifically, a fuel shift may be determined by monitoring changes in air-fuel ratios over time as an engine enters DFSO and exits out of DFSO.

At 402, engine operating conditions such as engine speed (Ne), engine load, air-fuel ratios, torque, accelerator pedal position, temperature, etc. may be estimated/measured. Engine operating conditions may be determined based on feedback from various engine sensors. At 404, it may be determined if a DFSO event has been initiated. During DFSO, the engine is operated without fuel injection while the engine rotates and pumps air through the cylinders. DFSO entry conditions may be based on various vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, the DFSO entry conditions may be based on an engine speed below a threshold. In another example, the DFSO entry conditions may be based on an engine load below a threshold. In still another example, the DFSO condition may be based on an accelerator pedal position. Additionally or alternatively, entry into DFSO may be determined based on a commanded signal to cease fuel injection.

If it is determined at 404 that a DFSO event has not been initiated, routine 400 may end. However, if a DFSO event has been initiated, routine 400 may proceed to 406 where it may be determined if the exhaust gas sensor is degraded.

The exhaust gas sensor may exhibit six discrete types of degradation behavior. The degradation behavior types may be categorized as asymmetric type degradation (e.g., rich-to-lean asymmetric delay, lean-to-rich asymmetric delay, rich-to-lean asymmetric filter, lean-to-rich asymmetric filter) that affects only lean-to-rich or rich-to-lean exhaust gas sensor response rates, or symmetric type degradation (e.g., symmetric delay, symmetric filter) that affects both lean-to-rich and rich-to-lean exhaust gas sensor response rates. The delay type degradation behaviors may be associated with the initial reaction of the exhaust gas sensor to a change in exhaust gas composition and the filter type degradation behaviors may be associated with a duration after an initial exhaust gas sensor response to transition from a rich-to-lean or lean-to-rich exhaust gas sensor output.

FIGS. 7a-7f each show a graph indicating one of the six discrete types of exhaust gas sensor degradation behaviors. The graphs plot air-fuel ratio (lambda) versus time (in seconds). In each graph, the dotted line indicates a commanded lambda signal that may be sent to engine components (e.g., fuel injectors, cylinder valves, throttle, spark plug, etc.) to generate an air-fuel ratio that progresses through a cycle comprising one or more lean-to-rich transitions and one or more rich-to-lean transitions. In the depicted figures, the engine is entering into and exiting out of DFSO. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

FIG. 7a shows a graph indicating a first type of degradation behavior that may be exhibited by a degraded exhaust gas sensor. This first type of degradation behavior is a symmetric filter type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 7b shows a graph indicating a second type of degradation behavior that may be exhibited by a degraded exhaust gas sensor. The second type of degradation behavior is an asymmetric rich-to-lean filter type that includes slow exhaust gas sensor response to the commanded lambda signal for a transition from rich-to-lean air-fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

FIG. 7c shows a graph indicating a third type of degradation behavior that may be exhibited by a degraded exhaust gas sensor. The third type of behavior is an asymmetric lean-to-rich filter type that includes slow exhaust gas sensor response to the commanded lambda signal for a transition from lean-to-rich air-fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

FIG. 7d shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

FIG. 7e shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air-fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7f shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air-fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

In one example, exhaust gas sensor degradation may be determined based on characteristics of a distribution of extreme values of calculated lambda differentials collected during engine operation. The characteristics may be a mode and central peak of a generalized extreme value (GEV) distribution of the extreme lambda differentials collected during steady state operating conditions. These characteristics are illustrated in the example graphs of FIGS. 8a and 8b. Asymmetric delay or asymmetric filter degradation may be determined based on the magnitude of the central peak and/or the magnitude of the mode. Further classification, for example, symmetric delay or symmetric filter, may be based on a determined sensor delay or a determined sensor time constant.

FIG. 8a shows four distinct regions of an example graph where an extreme value distribution may be mapped. On the y-axis is the central peak of the distribution. On the x-axis is the mode of the calculated lambda differentials. Sensor degradation may be determined based on the magnitude of the central peak and the mode. FIG. 8b shows an example graph illustrating two example extreme value distribution curves, 802 and 804.

A high central peak in the distribution may indicate sensor degradation. Specifically, a high central peak may indicate an asymmetric delay behavior, wherein the time delay from when a commanded change in air-fuel ratio is received to when the change actually occurs is larger than expected. Because the delay is asymmetric, either more time will be spent at rich operation (if the delay is a rich-to-lean delay) or more time will be spent at lean operation (if the delay is a lean-to-rich delay). In either case, less overall variation will be present.

Thus, as shown in the examples of FIGS. 8a and 8b, if the central peak is higher than a first threshold, T1, an asymmetric delay sensor degradation behavior may be indicated. Curve 802 shows a sensor with a high central peak. In one example, first threshold T1 may be determined by plotting a distribution of the extreme values for a new, non-degraded sensor, and the first threshold may be the central peak of the distribution of the non-degraded sensor.

If the central peak is less than the first threshold T1, a mode of the distribution may be evaluated. The mode is the lambda differential value that occurs in the distribution most frequently. A symmetric sensor, that is a sensor that does not display any asymmetric sensor degradation, will typically have a mode in a symmetric range centered around zero, bounded by a second and third threshold. The second (T2) and third (T3) thresholds can be determined in a manner similar to the first, central peak threshold. Example second and third thresholds, T2 and T3, are illustrated in FIGS. 8a and 8b.

If the mode is smaller or larger than the symmetric range, asymmetric filter type degradation behavior is indicated. If the mode is larger than the second threshold T2, a rich-to-lean filter degradation. In this case, the sensor experiences a delay in the response to a commanded rich to lean change, and thus spends less time at the commanded lean lambda, than at the commanded rich lambda. Thus, a greater amount of the lambda differentials will occur with values with a positive (lean) magnitude.

If the mode is less than the third threshold T3, a lean to rich filter sensor degradation may be present. An example GEV distribution curve with a mode less than the third threshold T3 is illustrated as curve 804 of FIG. 8b. If the mode is greater than the third threshold but less than second threshold, the mode is in the symmetric range. Based on the characteristics of the distribution, symmetric delay and symmetric filter degradation as well as no degradation cannot be distinguished from each other.

To distinguish symmetric delay degradation from a sensor without degradation, the sensor time delay may be compared with a nominal time delay. The nominal sensor time delay is the expected delay in sensor response to a commanded air-fuel ratio change based on the delay from when the fuel is injected, combusted, and the exhaust travels from the combustion chamber to the exhaust sensor. The determined time delay may be when the sensor actually outputs a signal indicating the changed air-fuel ratio. If the time delay is not less than or equal to the nominal time delay, a symmetric delay degradation behavior may exist in the exhaust gas sensor.

To distinguish a sensor with symmetric filter degradation from a sensor without degradation, a time constant of the sensor may be compared with a nominal time constant. The nominal time constant may be the time constant indicating how quickly the sensor responds to a commanded change in lambda, and may be determined off-line based on non-degraded sensor function. If the determined time constant of the sensor is greater than the nominal time constant, the sensor has a slow response rate, and thus, a symmetric filter degradation behavior.

If the time constant is less than or equal to the nominal time constant, a sensor without degradation may be diagnosed. No degradation may be indicated due to the characteristics of the distribution indicating a symmetric behavior of the sensor, and both the sensor time constant and delay being similar to the nominal time constant and delay.

Thus, the exhaust gas sensor may be determined to be robust if the central peak of the distribution is less than a first threshold (T1) and if the mode is between second threshold T2 and third threshold T3. Further, the sensor may be robust if the time delay is less than or equal to a nominal time delay, and the time constant is less than or equal to a nominal time constant.

Returning to 406 of routine 400 in FIG. 4, if it is determined that the exhaust gas sensor is degraded, routine 400 may be disabled and the fuel shift determination and/or indication may be aborted. On the other hand, if the exhaust gas sensor is determined to be non-degraded and robust, routine 400 continues to 410 to record changes in lambda (air-fuel ratio) over time during DFSO entry. These changes in lambda may be detected by the exhaust gas sensor and can be stored in the memory of the controller or the dedicated controller during the transition into DFSO.

At 412, routine 400 may confirm that the entry into DFSO is complete. For example, entry into DFSO may be complete when a steady state lambda value has been attained. In another example, an entry into DFSO may be considered to be completed if a pre-determined lambda has been attained.

If it is determined that DFSO entry is not complete, routine 400 may return to 410 and continue to record changes in air-fuel ratio. However, if entry into DFSO is complete, routine 400 may proceed to 414 to stop recording changes in lambda. The exhaust gas sensor may continue to be monitored.

At 416, it may be determined if an exit out of DFSO has been triggered. Exit out of DFSO may be based on a commanded signal to begin fuel injection in one example. In another example, a DFSO event may be ended based on a driver tip-in, the vehicle speed reaching a threshold value, and/or engine load reaching a threshold value. If an exit out of DFSO is not initiated, routine 400 continues to wait until a DFSO exit is commanded. If at 416 it is confirmed that a DSFO exit has been initiated, routine 400 continues to 418 to record changes in lambda over time during the exit out of DFSO. When the engine exits DFSO, the commanded air-fuel ratio may be restored, and changes in the air-fuel ratio detected by the exhaust gas sensor can be stored in the memory of the controller or the dedicated controller during the transition out of DFSO.

At 420, it may be determined if the exit out of DFSO is complete. In one example, the exit out of DFSO may be considered complete if a steady state lambda value has been attained. In another example, the exit out of DFSO may be considered complete when the measured air-fuel ratio is at a desired or commanded value. Thus, changes in air-fuel ratio over time may be monitored by the exhaust gas sensor until the detected lambda reaches a desired stoichiometric value.

If the exit out of DFSO is not complete, air-fuel ratio changes may continue to be monitored and stored in the controller's memory. On the other hand, if exit out of DFSO has been completed, at 422, the recording of changes in lambda may be discontinued. Further, at 424, the presence of a fuel shift may be determined via routine 500 of FIG. 5 and routine 400 may end.

Turning now to FIG. 5, it shows routine 500 for determining the presence of a fuel shift in an engine system of a vehicle based on results collected during routine 400. Specifically, changes in lambda over time recorded during an entry into and an exit out of DFSO are used to calculate time delays, the calculated time delays being compared to an expected entry time delay and an expected exit time delay to determine the presence of a fuel shift. Further, if the presence of a fuel shift is confirmed, an engine parameter may be adjusted to compensate for the determined fuel shift.

At 502, routine 500 may determine an expected entry delay (TD_entry_exp) and a measured entry time delay (TD_entry) during the DFSO entry. The measured entry time delay may be determined as described earlier with respect to FIGS. 2 and 3. For example, an entry time delay may be measured as the duration from a start of entry into DFSO until a first threshold change in lambda is achieved.

The expected time delay between the change in the commanded air fuel ratio and the initial exhaust gas sensor response may be determined from several sources of delay. First, there is a delay contribution from the injection-intake-compression-expansion-exhaust cycle. This delay contribution may be proportional to the inverse of the engine speed. Secondly, there is a delay contribution from the time for the exhaust gas to travel from the exhaust port of the engine cylinders to the exhaust gas sensor. This delay contribution may vary with the inverse of the velocity or air mass flow rate of gas in the exhaust passage. Finally, there are delay contributions induced by processing times, the filtering applied to the exhaust gas sensor signal, and the time required for the filtered exhaust gas sensor signal to change the required delta lambda. It will be appreciated that the expected entry time delay may be for engine conditions without the presence of fuel shifts.

At 504, an expected exit time delay (TD_exit_exp) and a measured exit time delay (TD_exit) during a DFSO exit is determined, similar to the time delay for the DFSO entry described above. For example, the exit time delay may be the duration from a start of the exit out of DFSO until a second threshold change in lambda is reached.

At 506, routine 500 may confirm if a fuel shift condition exists. A fuel shift condition may be determined according to routine 600 of FIG. 6 which will be described in more detail below. If a fuel shift condition is not confirmed, routine 500 exits, and standard engine operation may continue.

If a fuel shift condition is confirmed, routine 500 proceeds to 508 where a counter of fuel shift readings may be incremented by one. Next, at 510, it may be determined if the number of readings confirming the presence of a fuel shift is higher than a threshold (Threshold$_F$). If it is determined that the number of fuel shift readings is below Threshold$_F$, routine 500 continues to 512 to maintain existing engine operation. However, if the number of readings determining a fuel shift are higher than Threshold$_F$, the determined fuel shift may be flagged. To ensure adequate engine control to maintain engine emissions and fuel economy at a desired level, one or more engine operating parameters may be adjusted at 514, if desired. The adjusted engine parameter may be one or more of fuel injection amount, fuel injection timing, valve timing, and throttle position. For example, if the determined and indicated fuel shift is a lean fuel shift, fuel injection amount may be increased and/or an opening of throttle may be reduced. In another example, if a rich fuel shift is indicated, fuel injection amount may be decreased and/or the opening of the throttle may be increased. Upon adjusting engine operating parameters, routine 500 exits.

FIG. 6 is an example flow chart illustrating routine 600 for indicating a fuel shift based on determined and expected time delays during exit and entry into DFSO. Routine 600 may be carried out by controller 12 and/or dedicated controller 140, and may be executed during 506 of routine 500 described above.

At 602, measured entry time delay (TD_entry) may be compared with the expected entry time delay (TD_entry_exp), and measured exit time delay (TD_exit) may be compared with expected exit time delay (TD_exit_exp). Specifically, at each DFSO event, the measured time delay at entry and exit may be compared with its respective expected time delay to determine a difference in the time delays.

At 604, it is determined if one of the entry or exit time delays is greater than its respective expected time delay. If no, routine 600 continues to 606 where it may determine and indicate that a fuel shift condition is not present. If yes, routine 600 proceeds to 608 where it may be confirmed if TD_entry is greater than TD_entry_exp, and TD_exit is equal to TD_exit_exp. In other words, it may be confirmed if the measured entry time delay is greater than the expected entry delay while the measured exit time delay is substantially the same as the expected exit time delay. In other examples, the measured exit time delay may be within a threshold of the expected exit time delay.

If yes, routine 600 proceeds to 610 to indicate the presence of a rich fuel shift condition in the engine. If no, at 612, routine 600 may determine that TD_entry is equal to TD_entry_exp and TD_exit is greater than TD_exit_exp. In other words, the measured entry delay is substantially equal to the expected time delay during DFSO entry while the measured exit time delay is greater than the expected exit time delay. In other examples, the measured entry time delay may be within a threshold of the expected entry time delay. Therefore, at 614, routine 600 may indicate the presence of a lean fuel shift condition.

Thus, the methods presented herein provide for determining the presence of a fuel shift condition based on time delay responses of the exhaust gas sensor collected during an entry into and a subsequent exit out of DFSO. A rich fuel shift may be indicated if only an entry time response from the exhaust gas sensor exceeds an expected entry time delay while a lean fuel shift may be indicated if only an exit time response exceeds an expected exit time delay. Herein, an entry time delay is a duration from a start of the entry into DFSO to a first threshold change in air-fuel ratio, and an exit time delay is a duration from a start of the exit out of DFSO to a second threshold change in air-fuel ratio. If a fuel shift condition is present, an engine operating parameter may be adjusted based on the determined fuel shift. The adjusted engine operating parameter may be one or more of fuel injection amount, fuel injection timing, valve timing, and throttle position. Further, the exhaust gas sensor may be evaluated for degradation before monitoring the time delay response from the exhaust gas sensor during the entry into and exit out of DFSO condition. If the exhaust gas sensor is determined to be degraded, fuel shift determination and indication may be disabled.

In this way, presence of fuel shifts during engine operation may be determined in a passive and non-intrusive manner. Engine control and operation may be improved by adjusting engine parameters to mitigate existing fuel shifts. Overall, fuel economy and emissions may be better controlled.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
an engine including a fuel injection system;
an exhaust gas sensor coupled in an exhaust system of the engine; and
a controller with computer-readable instructions stored in non-transitory memory for:
during each of a plurality of entries into and exits out of DFSO,
monitoring a collected change in air-fuel ratio over time during the entry into and exit out of DFSO; and
determining a fuel shift based on an entry time delay and an exit time delay from the exhaust gas sensor.

2. The system of claim 1, wherein the controller is further configured for determining a lean shift when the entry time delay is substantially the same as an expected delay when entering into DFSO, and the exit time delay exceeds an expected time delay when exiting out of DFSO.

3. The system of claim 1, wherein the controller is further configured for determining a rich shift when the entry time delay exceeds an expected time delay when entering into DFSO, and the exit time delay is substantially the same as an expected time delay when exiting out of DFSO.

4. The system of claim 1, wherein the controller includes further instructions for adjusting an engine operating parameter based on the determined fuel shift.

5. The system of claim 4, wherein the engine operating parameter is one or more of fuel injection amount, fuel injection timing, valve timing, and throttle position.

6. The system of claim 1, wherein the exhaust gas sensor is a universal exhaust gas oxygen sensor.

7. An engine method comprising:
monitoring a time delay response from an exhaust gas sensor during an entry into and an exit out of DFSO; and
indicating a rich fuel shift if only an entry time delay response from the exhaust gas sensor exceeds an expected entry time delay, and indicating a lean fuel shift if only an exit time delay response from the exhaust gas sensor exceeds an expected exit time delay.

8. The engine method of claim 7, wherein an entry time delay is a duration from a start of the entry into DFSO to a first threshold change in air-fuel ratio, and wherein an exit time delay is a duration from a start of the exit out of DFSO to a second threshold change in air-fuel ratio.

9. The engine method of claim 7, further comprising determining if the exhaust gas sensor is degraded before monitoring the time delay response from the exhaust gas sensor during the entry into and exit out of DFSO condition.

10. The engine method of claim 9, further comprising aborting monitoring the time delay response from the exhaust gas sensor during entry into and exit out of DFSO if the exhaust gas sensor is determined to be degraded.

11. A method for an engine comprising:
indicating a fuel shift based on a time delay of an exhaust gas sensor during an entry into and an exit out of deceleration fuel shut off (DFSO).

12. The method of claim 11, wherein the time delay of the exhaust gas sensor is a duration from one of a start of the entry into and a start of the exit out of DFSO to a respective threshold change in air-fuel ratio.

13. The method of claim 12, further comprising indicating a rich fuel shift when the time delay of the exhaust gas sensor during the entry into DFSO is greater than an expected entry time delay, and the time delay of the exhaust gas sensor during the exit out of DFSO is within a threshold of an expected exit delay.

14. The method of claim 13, further comprising indicating a lean fuel shift when the time delay of the exhaust gas sensor when entering DFSO is within a threshold of an expected entry time delay, and the time delay of the exhaust gas sensor when exiting out of DFSO is greater than an expected exit time delay.

15. The method of claim 13, further comprising evaluating the exhaust gas sensor for degradation before monitoring the time delay of the exhaust gas sensor during entry into and exit out of DFSO.

16. The method of claim 15, further comprising disabling indicating the fuel shift when the exhaust gas sensor is degraded.

17. The method of claim 11, further comprising adjusting an engine operating parameter based on the indicated fuel shift.

18. The method of claim 17, wherein the engine operating parameter is one or more of fuel injection amount, fuel injection timing, valve timing, and throttle position.

\* \* \* \* \*